United States Patent [19]
Hagiwara et al.

[11] Patent Number: 5,791,446
[45] Date of Patent: Aug. 11, 1998

[54] VISCOUS COUPLING HAVING A TOOTHED HUB USED AS A CARRIER FOR THE INNER

[75] Inventors: Makoto Hagiwara, Bonn; Manfred Hofer, Siegburg, both of Germany

[73] Assignees: GKN Viscodrive GmbH, Lohmar, Germany; Viscodrive Japan KK, Tochigi, Japan

[21] Appl. No.: 832,310

[22] Filed: Apr. 3, 1997

Related U.S. Application Data

[63] Continuation of Ser. No. 455,101, May 31, 1995, Pat. No. 5,662,196.

[30] Foreign Application Priority Data

Jun. 1, 1994 [DE] Germany ............... 44 19 232.0

[51] Int. Cl.$^6$ ............... F16D 35/00; F16D 13/52
[52] U.S. Cl. ............... 192/58.41; 192/70.2
[58] Field of Search ............... 192/58.41, 58.42, 192/70.2; 74/431, 434, 438; 403/159

[56] References Cited

U.S. PATENT DOCUMENTS

| | | |
|---|---|---|
| 1,189,176 | 6/1916 | Price . |
| 3,744,605 | 7/1973 | Piret . |
| 3,982,415 | 9/1976 | Killop . |
| 4,012,968 | 3/1977 | Kelbel . |
| 4,058,027 | 11/1977 | Webb . |
| 4,683,997 | 8/1987 | Stockmar et al. . |
| 4,779,476 | 10/1988 | Anderson et al. . |
| 4,905,808 | 3/1990 | Tomita et al. . |
| 4,966,268 | 10/1990 | Asano et al. . |
| 4,982,808 | 1/1991 | Taureg et al. . |
| 5,005,685 | 4/1991 | Takano et al. . |
| 5,007,515 | 4/1991 | Shimizu . |
| 5,007,885 | 4/1991 | Yamamoto et al. . |
| 5,012,908 | 5/1991 | Kobayashi et al. . |
| 5,031,743 | 7/1991 | Morishita et al. . |
| 5,036,963 | 8/1991 | Murata . |

(List continued on next page.)

FOREIGN PATENT DOCUMENTS

| | | |
|---|---|---|
| 0 480 175 | 4/1992 | European Pat. Off. . |
| 0 549 828 | 7/1993 | European Pat. Off. . |
| 938813 | 7/1949 | Germany . |
| 4 103 054 | 8/1991 | Germany . |
| 4 032 245 | 3/1992 | Germany . |
| 1-220728 | 9/1989 | Japan . |
| 2-120530 | 5/1990 | Japan . |
| 369829 | 3/1991 | Japan . |
| 6-50132 | 6/1994 | Japan . |
| 6-280896 | 10/1994 | Japan . |
| 2 202 602 | 9/1988 | United Kingdom . |
| 2 222 232 | 2/1990 | United Kingdom . |

*Primary Examiner*—Rodney H. Bonck
*Attorney, Agent, or Firm*—Dinnin & Dunn, P.C.

[57] ABSTRACT

The invention relates to a viscous coupling 1 having a housing 2 consisting of a tubular housing casing 3, and end walls 4, 5 extending radially relative to the longitudinal axis 9. Furthermore the viscous coupling 1 comprises a hub 11 which is manufactured from a tube in a non-chip producing forming operation and which, by means of bearing faces 13 and 14, is relatively rotatably supported in the end walls 4, 5 of the housing 2. The inner toothing 10 of the housing 2 non-rotatably accommodates outer plates 35. Inner plates 36 are non-rotatably associated with the hub 11 so as to alternate with the outer plates 35. The inner plates 36 are received in the outer toothing 15 of the hub 11. The hub 11 also comprises inner toothing 30 to provide a non-rotating connection with corresponding outer toothing 29 of a shaft 28. The sets of toothing 15, 30 of the hub 11 are produced from a cylindrical tube by a non-chip generating forming operation so that in each case a tooth of the outer toothing 15 forms a gap between the teeth of the inner toothing 30. In this way it is possible to produce a space-saving assembly allowing the radial overlap X of the outer plates 35 and inner plates 36 to be enlarged so that while the space required for assembly remains the same, the torque transmitting capacity is increased.

6 Claims, 2 Drawing Sheets

U.S. PATENT DOCUMENTS

| | | |
|---|---|---|
| 5,056,640 | 10/1991 | Yamamoto . |
| 5,063,738 | 11/1991 | Asano et al. . |
| 5,070,975 | 12/1991 | Tanaka et al. . |
| 5,078,536 | 1/1992 | Anderson . |
| 5,080,187 | 1/1992 | Asano et al. . |
| 5,101,951 | 4/1992 | Weise et al. . |
| 5,127,503 | 7/1992 | Gratzer . |
| 5,178,249 | 1/1993 | Haga et al. . |
| 5,197,583 | 3/1993 | Sakai et al. . |
| 5,203,439 | 4/1993 | Peier . |
| 5,259,488 | 11/1993 | Oberdorster et al. . |
| 5,388,474 | 2/1995 | Tanaka et al. . |
| 5,419,417 | 5/1995 | Madsack ............... 192/58.41 X |
| 5,529,160 | 6/1996 | Tanaka et al. ............... 192/70.2 |
| 5,662,196 | 9/1997 | Hagiwara et al. ............... 192/58.41 |

VISCOUS COUPLING HAVING A TOOTHED HUB USED AS A CARRIER FOR THE INNER

This is a continuation of the United States patent application Ser. No. 08/455,101, filed May 31, 1995, and now U.S. Pat. No. 5,662,196.

BACKGROUND OF THE INVENTION

1. Field of the Invention

The invention relates to a viscous coupling having a housing which consists of a tubular housing casing and to whose ends there are attached end walls so as to extend radially relative to the longitudinal axis; having a hollow hub which is arranged coaxially thereto in the housing and which, at its two ends, is received in bores in the end walls by means of cylindrical bearing faces so as to be rotatable relative to the housing around the longitudinal axis; having annular outer plates and inner plates partially radially overlapping and arranged alternately in a certain sequence in the inner chamber formed between the housing and the hub; and having a highly viscous fluid, especially silicone oil which at least partially fills the part of the inner chamber not occupied by the outer plates and inner plates, with the outer plates, by means of teeth provided at their outer circumference, being non-rotatably received in inner toothing of the housing extending parallel to the longitudinal axis and with the inner plates, by means of teeth provided in their central bore, being non-rotatably received in outer toothing of the hub extending parallel to the longitudinal axis and with the hub, in its cavity, being provided with further inner toothing for being connected to a shaft.

2. Description of the Related Art

Such a viscous coupling is described in GB-PS 1367 106 for example.

Such viscous couplings are used in the driveline of motor vehicles for example in order to lock, at least to a limited extent, the effect of the differential between the wheels of an axle or between the two axles of a vehicle, or to pass on torque as a result of the speed differentials occurring.

When using such viscous couplings in the axle (e.g. the front axle of a front wheel drive vehicle or in the rear axle of a rear wheel drive vehicle), space is limited. In particular, this applies to fitting such couplings in the front axle differential of a front wheel drive vehicle. Apart from the restricted space conditions, the weight of the vehicle is also significant. The dimensions of the viscous coupling are determined by the free space remaining in the differential drive. As far as the torque transmitting capacity of a viscous coupling is concerned, the amount of overlap of the plates arranged in the inner chamber between the housing and hub of the viscous coupling is also important. The greater the amount of overlap, the greater the torque transmitting capacity.

SUMMARY OF THE INVENTION

It is therefore the object of the invention to provide a viscous coupling whose weight is reduced and which, with existing space conditions, features an increase in its torque capacity.

In accordance with the invention, the objective is achieved in that the hub is manufactured by a non-chip-producing forming operation, starting from a cylindrical tube, with the teeth of the outer toothing of the hub forming the gaps between the teeth of the inner toothing of the hub and with the gaps between the teeth of the outer toothing of the hub forming the teeth of the inner toothing of the hub.

The advantage of this embodiment is that, for example, with a predetermined outer diameter of the housing of the viscous coupling and a predetermined outer diameter of the shaft to be connected to the coupling hub and to be inserted into same, there exists an increased radial distance between the major diameter of the outer toothing of the hub and the major diameter of the inner toothing of the housing, which, in turn, results in a greater radial overlap between the plates to be arranged in the inner chamber of the viscous coupling. This means, with unchanged space conditions, the viscous coupling in accordance with the invention features a higher torque transmitting capacity than the viscous coupling according to the state of the art.

Furthermore, the solution in accordance with the invention achieves a reduction in weight because the wall thickness of the hub as viewed in a cross-section in the region of its toothing remains substantially constant. Furthermore, costs are reduced because both the outer toothing and inner toothing are produced in one single operation. In addition, the introduction of forces between the hub and the inner plates associated with the hub is improved. The embodiment as selected also achieves an increase in strength. As in most cases, the inner plates associated with the hub also constitute the axially adjustable viscous coupling plates, it is also possible to achieve an improvement in the friction conditions between the inner plates and the outer toothing used for axially adjusting same because non-chip-producing forming operations achieve smoother surfaces.

According to a preferred embodiment it is proposed that in the region of the two bearing faces, the wall thicknesses of the hub are identical.

However, in such a case the wall thickness has to be such as to permit assembly of both the shaft together with the inner toothing and of the inner plates with the outer toothing of the hub.

In one embodiment of the invention, the inner diameters of the hub, in the region of the two bearing faces, are identical, with both, in respect of size, corresponding at least to the base diameter of the inner toothing of the hub.

According to a preferred embodiment it is proposed that in the region of the two bearing faces, the inner diameter of the hub is smaller than the base diameter of the inner toothing of the hub and that in the region of the other bearing face, the inner diameter of the hub is equal to or greater than the base diameter of the inner toothing of the hub.

The solution is complemented in that the end face of the bearing face region with the greater diameter, in the direction of the longitudinal axis, is supported against a stop associated with the end wall in which the bearing face is received.

In this context it is also proposed that the bearing face diameter of the bearing face with the smaller diameter is equal to or smaller than the base diameter of the outer toothing of the hub.

These characteristics ensure that the shaft can be accurately inserted into the inner toothing of the hub and that, in addition, the inner plates can be positioned on the outer toothing of the hub and that the hub, by means of its outer toothing, can be inserted into the inner toothing of the inner plates.

There are several possibilities of shaping the hub toothings. According to a first proposal, the hub toothings are provided in the form of pointed toothings rounded off at their tips and roots.

Alternatively, the hub toothings are provided in the form of rectangular toothings rounded off at their tips and roots.

3

A preferred embodiment of the invention is diagrammatically illustrated in the drawings.

DESCRIPTION OF THE PREFERRED EMBODIMENT

Figure 1:
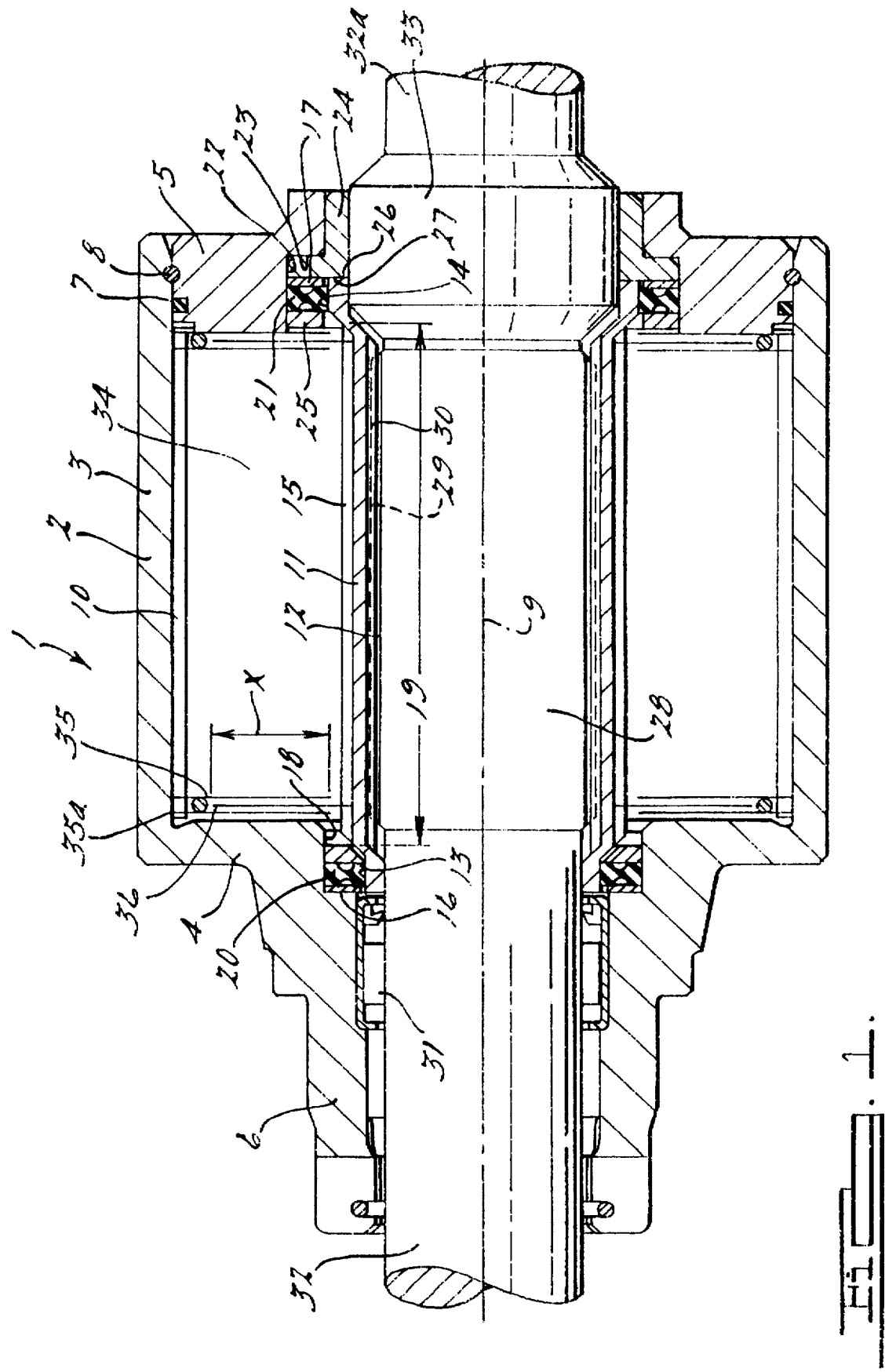
FIG. 1 shows half a longitudinal section through a viscous coupling in accordance with the invention.

The viscous coupling 1 according to FIG. 1 comprises the housing 2 substantially consisting of the housing casing 3 and the two radially inwardly extending end walls 4, 5 connected thereto. The longitudinal axis of the viscous coupling 1 and thus of the housing 2 has been given the reference number 9. The housing 2, for example, constitutes the part connected to the carrier of a differential drive. It is thus the driven part. An attachment 6 comprising a bore is connected to the end wall 4. In the embodiment illustrated, the end wall 4 is integral with the housing casing 3. However, it may also be provided in the form of a separate component and connected to the housing casing 3 by a weld. The end wall 5 constitutes a loose cover which is inserted into a recess of the housing casing 3, which is sealed relative thereto by a seal 7 and held in position by a securing ring 8.

The inner face of the housing casing 3 is provided with toothing 10 consisting of teeth extending parallel to the longitudinal axis 9. The inner circumference is provided with a plurality of circumferentially distributed teeth.

A hub 11 is received in bores of the two end walls 4, 5 so as to be rotatable relative to the housing 2. The hub 11 comprises a cavity 12 in the form of a bore extending over the entire length thereof.

Figure 2:
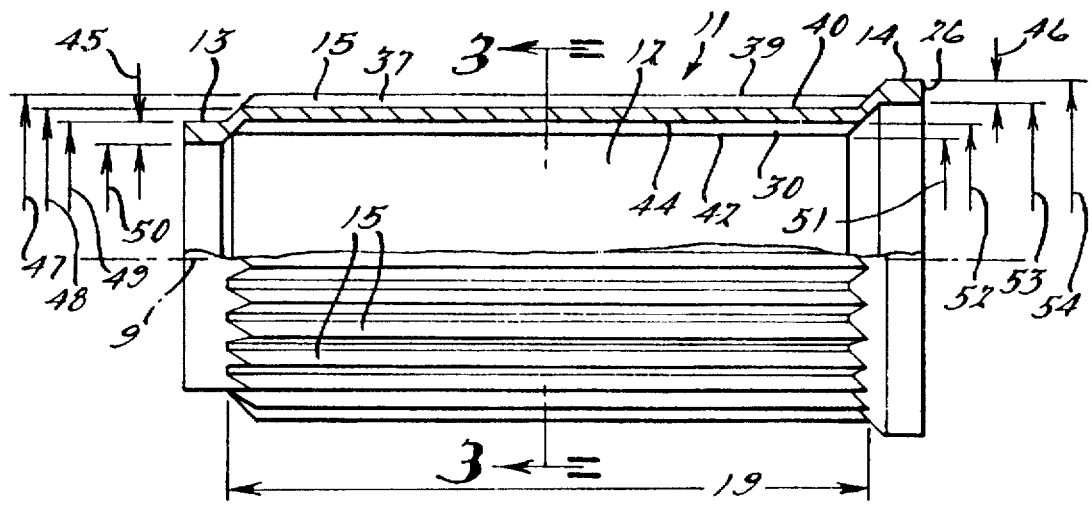
FIG. 2 shows half a longitudinal section through a hub shown in the form of a detail in an enlarged scale.

As is particularly obvious in FIG. 2, the hub 11, at each of its ends, comprises a bearing face 13, 14, with the bearing face 13 being associated with the end wall 4 and the bearing face 14 with the end wall 5. Between the two bearing faces 13, 14, the outer face of the hub 11 is provided with outer toothing 15 whose teeth extend parallel to the longitudinal axis 9 and are circumferentially distributed. The end walls 4, 5, are provided with recesses 18, 22 centered on the longitudinal axis. The recesses 18, 22 receive supporting discs 16, 17 and seals 20, 21 which have a sealing function between the end walls 4, 5 and the hub 11, with the seals 20, 21 resting against the bearing faces 13, 14 and in the recesses 18, 22. Furthermore, a holding ring 24 rests against the contact face 23 of the recess 22 of the end wall 5, with the end face 26 of the hub 11 being axially supported against the stop face 27 of the holding ring 24, extending radially relative to the longitudinal axis 9. The holding ring 24, the supporting disc 17 and the seal 21 are secured by the supporting ring 25 in the recess 22 of the end wall 5.

The shaft 28 is inserted into the cavity 12 of the hub 11 from the end of the end wall 5. The shaft 28 comprises outer toothing 29 matching the inner toothing 30 of the hub 11. Like the inner toothing 30 of the hub 11, the outer toothing 29 of the shaft 28 extends from the end of the bearing face 14 to the beginning of the bearing face 13, with reference to the hub portion 19 provided with outer toothing 15 and inner toothing 30.

4

The region of the hub 11 comprising an increased diameter, below the bearing face 14, is engaged by the shaft 28, by means of a collar 33 whose diameter has been increased accordingly. Furthermore, the shaft 28 axially projects from the attachment 6 associated with the end wall 4. The portion has been given the reference number 32 and serves, for example, to provide a connection with an output bevel gear of a differential drive, whereas the portion 32a of the shaft 28 outwardly projecting from the end wall 5 serves to connect a driveshaft for driving a front wheel of a motor vehicle for instance. Furthermore, the attachment 6 of the end wall 4 accommodates a rolling contact bearing 31 in the form of a needle bearing which supports the housing 2 of the viscous coupling 1 relative to the shaft 28.

Between the hub 11 and the housing 2 there is formed an inner chamber 34 accommodating outer plates 35 and inner plates 36 in a certain sequence along the longitudinal axis 9. On their outer circumference the outer plates 35 are provided with toothing matching the inner toothing 10 of the housing casing 3. The outer plates 35 are spaced by means of spacing elements 35a. In the embodiment shown, one inner plate 36 is arranged between each two outer plates 35. The inner plates 36 comprise a central bore provided with teeth which match the outer toothing 15 of the hub 11 and are received therein. Accordingly, the outer plates 35 rotate together with the housing 2, whereas the inner plates 36 rotate together with the hub 11. Additionally, the inner plates 36 are axially movable in the outer toothing 15 of the hub 11 until they come to rest against one of the adjoining outer plates 35. The outer plates 35 and inner plates 36 are annular in shape and radially overlap by the amount X. The outer plates 35 and inner plates 36 may also be arranged in a different sequence. For example, two inner plates 36 may be axially movably arranged between two outer plates 35. The outer plates 35 are preferably arranged so as to be spaced, whereas the inner plates 36 constitute the axially movable plates. However, the arrangement may also be reversed in that the outer plates 35 constitute the axially movable plates whereas the inner plates 36 are fixed to the hub 11. The sequence of outer plates 35 and inner plates 36 may change accordingly. For example, one or two movable outer plates may be arranged between two fixed inner plates.

Figure 3:
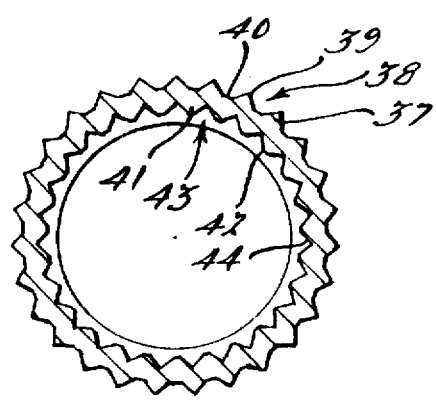
FIG. 3 shows a section III—III according to Fig. 2.

FIGS. 2 and 3 show a first embodiment of the hub 11 in an enlarged scale. The hub 11 is preferably manufactured from a thin-walled steel tube by a non-chip-producing forming operation. For instance, the cylindrical tube serving as the starting material is received on a mandrel whose outer circumference, along a certain length, comprises a profile which corresponds to the inner toothing 30 of the hub 11. The outer face of the cylindrical tube is acted upon by rollers or rolls which have the shape of the outer toothing 15 of the hub 11 and produce the toothing on the outer face of the hub 11. In the embodiment according to FIGS. 2 and 3, the outer toothing 15 and the inner toothing 30 are shaped like pointed teeth. The teeth associated with the outer toothing 15 have been given the reference number 37.

Between each set of two circumferentially arranged teeth 37 there is produced a gap 38. The tip 39 is rounded towards the flanks of the teeth 37. The root 40 is also rounded in the region of the gap 38. Each tooth 37 of the outer toothing 15 forms a gap 43 in the cavity 12 of the hub 11, whereas the gap 38 of the outer toothing 15 forms a tooth 41 of the inner toothing 30 in the cavity 12 of the hub. The tip 42 and root 44 of the inner toothing 30 are also rounded. Towards the right-hand side of the toothed portion of the hub 11, there follows the bearing face 14 whose diameter is increased and which comprises a circular-cylindrical inner diameter 53.

The circular-cylindrical outer diameter of the bearing face 14 has been given the reference number 54 and constitutes the bearing face diameter. The wall thickness in the region of the bearing face 14 has been given the reference number 46. Furthermore, the inner toothing comprises a major diameter 51 and a base diameter 52. The inner diameter 53 below the bearing face 14 is dimensioned in such a way that it is greater than the base diameter 52, so that from that end, a shaft with its outer toothing may be inserted into the inner toothing 30 without encountering any obstructions. The bearing face 14 is delimited by the end face 26 which serves as a stop face stopping the holding ring 24.

Towards its other end, the hub 11 comprises the bearing face 13 whose outer diameter 49 is reduced relative to the bearing face 14 and constitutes the bearing face diameter. The outer diameter 49 is smaller than the base diameter 48 of the outer toothing 15 of the hub 11. The major diameter of the outer toothing 15 has been given the reference number 47. The inner diameter of the hub 11 in the region of the bearing face 13 has the reference number 50. The inner diameter 50 approximately corresponds to the major diameter 51 of the inner toothing 30. The outer diameter 49 of the bearing face 13 is dimensioned in such a way that the inner plates may be slid on to the outer toothing 15, starting from the bearing face 13. The wall thickness of the hub 11 in the region of the bearing face 13 has the reference number 45 and that in the region of the bearing face 14 has the reference number 46. The two wall thicknesses 45, 46 may be substantially identical, whereas the wall thickness of the hub 11 in the region of the two sets of toothing 15, 30 is reduced relative to the wall thicknesses 45, 46. The circumferentially distributed teeth of the toothing providing the shaft shape have a stiffening effect on the hub 11, thus permitting the necessary torque to be transmitted.

Figure 4:
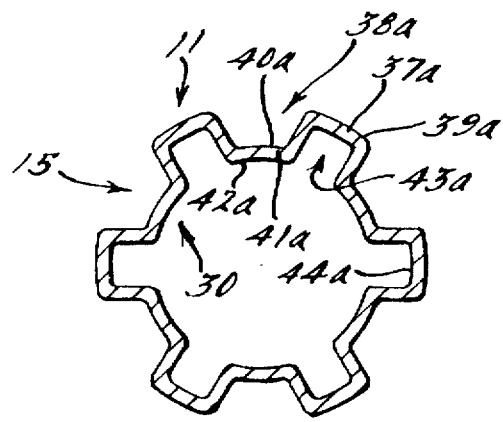
FIG. 4 is a section according to FIG. 3 through a further hub embodiment, with the inner and outer toothings comprising rectangular teeth.

FIG. 4, similar to FIG. 3, shows a section through a different embodiment of hub 11. The toothings 15, 30 are shown as being substantially rectangular in shape. The tooth 37a associated with the outer toothing 15 is substantially rectangular with straight flanks, with rounded portions existing between each tip 39a and the flanks. This also applies to the regions between the flanks of the teeth 37a and the tooth roots 40a. The inner toothing 30, is associated with gaps 43a positioned in the teeth 37a of the outer toothing 15, together with the root 44a and the tip 42a of the tooth 41a positioned between the gaps 43a, In the case of the inner toothing 30, rounded portions are provided between the tip 42a and the flanks of the teeth 41a and between the root 44a and the gaps 43a. Because of the thin-walled nature of the hub 11 and the possibility of using the teeth of the outer toothing towards the cavity of the hub 11 as gaps for the inner toothing, it is possible to achieve an increased radial dimension for the inner chamber 34. Thus, while the assembly space in respect of the radial dimensions of the shaft to be inserted into the hub and of the housing remains the same, it is possible to achieve an increased overlap X of the inner and outer plates because their radial dimensions were increased.

Figure 5:
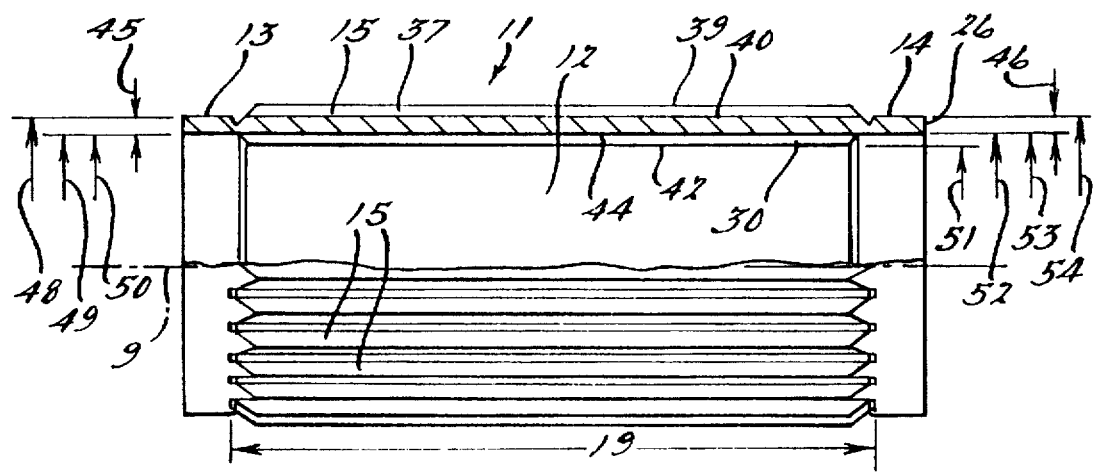
FIG. 5 shows a half longitudinal section through an alternate embodiment of a viscous coupling.

FIG. 5 shows a second embodiment of the hub 11 differing from the hub shown in FIG. 2 in the way that it shows identical wall thicknesses and identical inner diameters 50, 53 in region of the bearing faces 13, 14 of the hub 11. The bearing faces 13, 14 with respect to size correspond to the base diameter 52 of the inner toothing 30 and to the base diameter 48 of the outer toothing 15, respectively.

What is claimed is:

1. A viscous coupling having a housing which consists of:
   a tubular housing casing to whose ends there are attached end walls so as to extend radially relative to a longitudinal axis;
   a hollow hub which is arranged coaxially thereto in the housing and which, at its two ends, is received in bores in the end walls by means of cylindrical bearing faces so as to be rotatable relative to the housing around the longitudinal axis, at a region of said bearing faces wall thicknesses of the hub are identical and inner diameters of the hub are identical, said bearing faces with respect to size correspond at least to a base diameter of the inner toothing of the hub;
   annular outer plates and inner plates partially radially overlapping and arranged alternately in a certain sequence in an inner chamber formed between the housing and the hub; and
   a highly viscous fluid which at least partially fills a part of the inner chamber, the outer plates by means of teeth provided at an outer circumference, being non-rotatably received in inner toothing of the housing extending parallel to the longitudinal axis and the inner plates by means of teeth provided in a central bore, being non-rotatably received in outer toothing of the hub extending parallel to the longitudinal axis and the hub, in its cavity, being provided with further inner toothing for being connected to a shaft;
   the hub is manufactured by a non-chip-producing forming operation, starting from a cylindrical tube, with the teeth of the outer toothing of the hub forming gaps between the teeth of the inner toothing of the hub and with gaps between the teeth of the outer toothing of the hub forming the teeth of the inner toothing of the hub.

2. A viscous coupling according to claim 1 wherein the toothings of the hub are provided as pointed toothings rounded off at their tips and roots.

3. A viscous coupling according to claim 1 wherein the toothings of the hub are provided as rectangular toothings rounded off at their tips and roots.

4. A viscous coupling having a housing which consists of:
   a tubular housing casing and to whose ends there are attached end walls so as to extend radially relative to a longitudinal axis;
   a hollow hub which is arranged coaxially thereto in the housing and which, at its two ends, is received in bores in the end walls by means of cylindrical bearing faces so as to be rotatable relative to the housing around the longitudinal axis, at a region of said bearing faces wall thicknesses of the hub are identical and inner diameters of the hub are identical, said bearing faces with respect to size correspond at least to a base diameter of the inner toothing of the hub;
   annular outer plates and inner plates partially radially overlapping and arranged alternately in a certain sequence in an inner chamber formed between the housing and the hub; and
   a highly viscous fluid which at least partially fills a part of the inner chamber, with the outer plates, by means of teeth provided at their outer circumference, being non-rotatably received in inner toothing of the housing extending parallel to the longitudinal axis and with the inner plates, by means of teeth provided in their central bore, being non-rotatably received in outer toothing of the hub extending parallel to the longitudinal axis and with the hub, in its cavity, being providing with further inner toothing for being connected to a shaft;

characterized in that the hub is manufactured by a non-chip-producing forming operation, starting from a cylindrical tube, with the teeth of the outer toothing of the hub forming gaps between the teeth of the inner toothing of the hub and with the gaps between the teeth of the outer toothing of the hub forming the teeth of the inner toothing of the hub.

5. A viscous coupling according to claim 4, characterized in that the toothings of the hub are provided in the form of pointed toothings rounded off at their tips and roots.

6. A viscous coupling according to claim 4, characterized in that the too things of the hub are provided in the form of rectangular toothings rounded off at their tips and roots.

* * * * *

UNITED STATES PATENT AND TRADEMARK OFFICE
CERTIFICATE OF CORRECTION

PATENT NO. : 5,791,446

DATED : August 11, 1998

INVENTOR(S) : Makoto Hagiwara, et al.

It is certified that error appears in the above-identified patent and that said Letters Patent is hereby corrected as shown below: Title page, item [54], In the Title, after "Inner", please insert, --Plates--.
Column 1, in the Title, after "Inner", please insert, --Plates--.
Column 5, line 45, after "43a", please delete ",", and insert therefore, --.--.
Column 8, line 5, after "the", please delete, "too things", and insert therefore, --toothings--.

Signed and Sealed this

Sixteenth Day of November, 1999

Attest:

Q. TODD DICKINSON

*Attesting Officer*  *Acting Commissioner of Patents and Trademarks*